Jan. 12, 1960 D. L. JAFFE ET AL 2,921,187

MICROWAVE MIXER AND TUNER APPARATUS

Filed Sept. 9, 1955 8 Sheets-Sheet 1

INVENTORS
D. L. JAFFE
F. J. SKWAREK
BY Darby & Darby
ATTORNEYS

Jan. 12, 1960 D. L. JAFFE ET AL 2,921,187

MICROWAVE MIXER AND TUNER APPARATUS

Filed Sept. 9, 1955 8 Sheets-Sheet 2

INVENTORS
D. L. JAFFE
F. J. SKWAREK
BY
Darby & Darby
ATTORNEYS

MICROWAVE MIXER AND TUNER APPARATUS

Filed Sept. 9, 1955 8 Sheets-Sheet 3

INVENTORS
D. L. JAFFE
F. J. SKWAREK
BY Darby & Darby
ATTORNEYS

MICROWAVE MIXER AND TUNER APPARATUS

Filed Sept. 9, 1955 8 Sheets-Sheet 4

INVENTORS
D. L. JAFFE
F. J. SKWAREK
BY
Darby & Darby
ATTORNEYS

Jan. 12, 1960 D. L. JAFFE ET AL 2,921,187

MICROWAVE MIXER AND TUNER APPARATUS

Filed Sept. 9, 1955 8 Sheets-Sheet 5

INVENTORS
D. L. JAFFE
F. J. SKWAREK
BY
Darby & Darby
ATTORNEYS

Jan. 12, 1960 D. L. JAFFE ET AL 2,921,187

MICROWAVE MIXER AND TUNER APPARATUS

Filed Sept. 9, 1955 8 Sheets-Sheet 6

INVENTORS
D. L. JAFFE
F. J. SKWAREK
BY Darby & Darby
ATTORNEYS

MICROWAVE MIXER AND TUNER APPARATUS

Filed Sept. 9, 1955 8 Sheets-Sheet 7

INVENTORS
D. L. JAFFE
F. J. SKWAREK
BY Darby & Darby
ATTORNEYS

INVENTORS
D. L. JAFFE
F. J. SKWAREK
BY Darby & Darby
ATTORNEYS

United States Patent Office 2,921,187
Patented Jan. 12, 1960

2,921,187

MICROWAVE MIXER AND TUNER APPARATUS

David Lawrence Jaffe, Great Neck, and Frank J. Skwarek, Westbury, N.Y., assignors to Polarad Electronics Corporation, Long Island City, N.Y., a corporation of New York Application September 9, 1955, Serial No. 533,468

3 Claims. (Cl. 250—20)

The present invention relates to receiving apparatus for microwaves and is more particularly directed toward a microwave tuning head including an oscillator and a mixer, such apparatus being useful in microwave receivers, spectrum analyzers and other instruments.

The present invention provides an arrangement for tuning a microwave oscillator serving as a local oscillator of a heterodyne system and for supplying the output of that oscillator to a mixer to be combined with a received wave. For purposes of permitting proper adjustment and/or measurement of the received wave, the mixer is provided with alternate inputs by one of which the received wave is supplied directly to the mixer and by the other of which the received wave is supplied thereto through an attenuator. The mixer device is also provided with a tuning arrangement for tuning it to the received wave and local oscillator wave, and with a terminating or impedance matching arrangement.

The present invention is particularly concerned with providing simple and reliable structures in apparatus of the type disclosed, by which ready adjustment of the tuning of the local oscillator or of the mixer can be effected and adjustment of the attenuation interposed between a received wave and the mixer can be made. In particular, the mixer attenuator is formed as a single integrated device readily fabricated and efficient in its operation.

Accordingly, it is an object of the present invention to provide an improved tuning head for microwave operation.

It is a further object of the present invention to provide an improved mixer-attenuator for microwave operation having both direct wave and attenuated wave inputs for the received wave to be converted into an intermediate frequency wave.

Other objects and advantages of the present invention will become more fully apparent from consideration of the following description of a preferred embodiment thereof taken in conjunction with the appended drawings.

Figure 1:
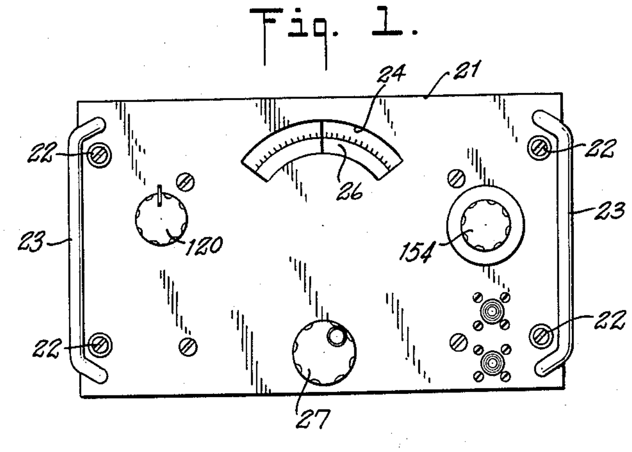
Fig. 1 is a front view showing a rack and panel incorporating the apparatus of the present invention.
Figure 7:
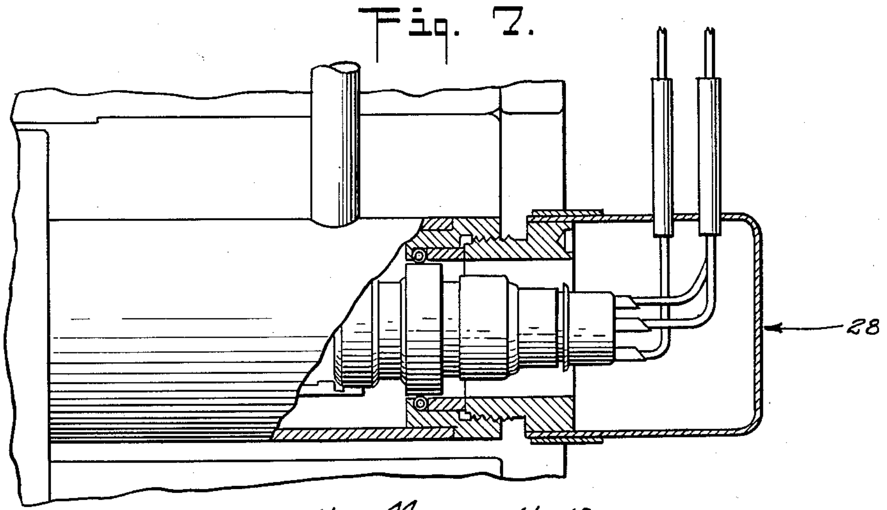
Fig. 7 is a top view of one detail of said apparatus showing the tube mounting and connections.
Figure 8:
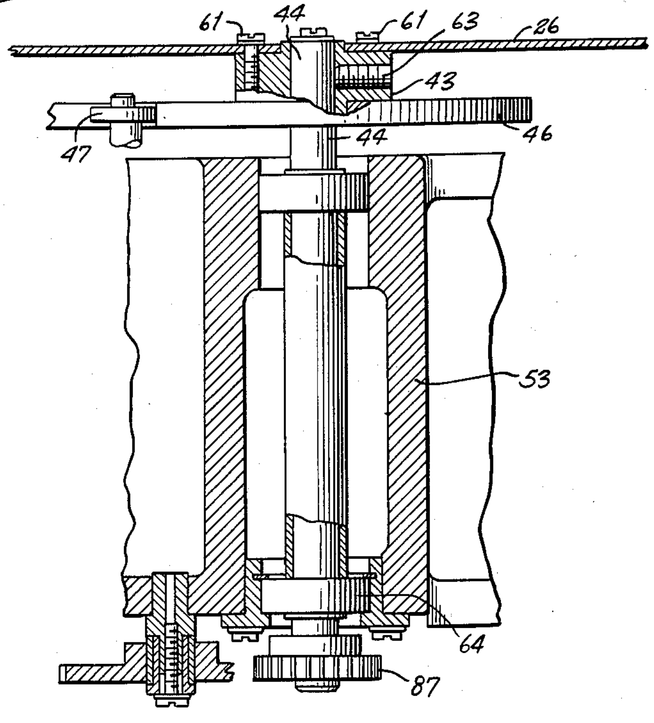
Fig. 8 is a fragmentary cross sectional view taken along line 8—8 of Fig. 5.

Fig. 1 shows a front elevational view of the chassis and panel of the present invention. As shown, the front panel 21 is secured to a chassis by means of screws 22, handles 23 being secured to the panel for permitting removing the entire chassis from a rack. Panel 21 has an opening 24 for viewing a dial therebehind. A knob 27 serves as the main tuning knob for the local oscillator tube indicated generally at 120 and shown more in detail in Fig. 7 described below. A further knob 29 serves as the control for an attenuator described below and knob 154 serves as a control for tuning a mixer stage, also as described below.

Figure 2:
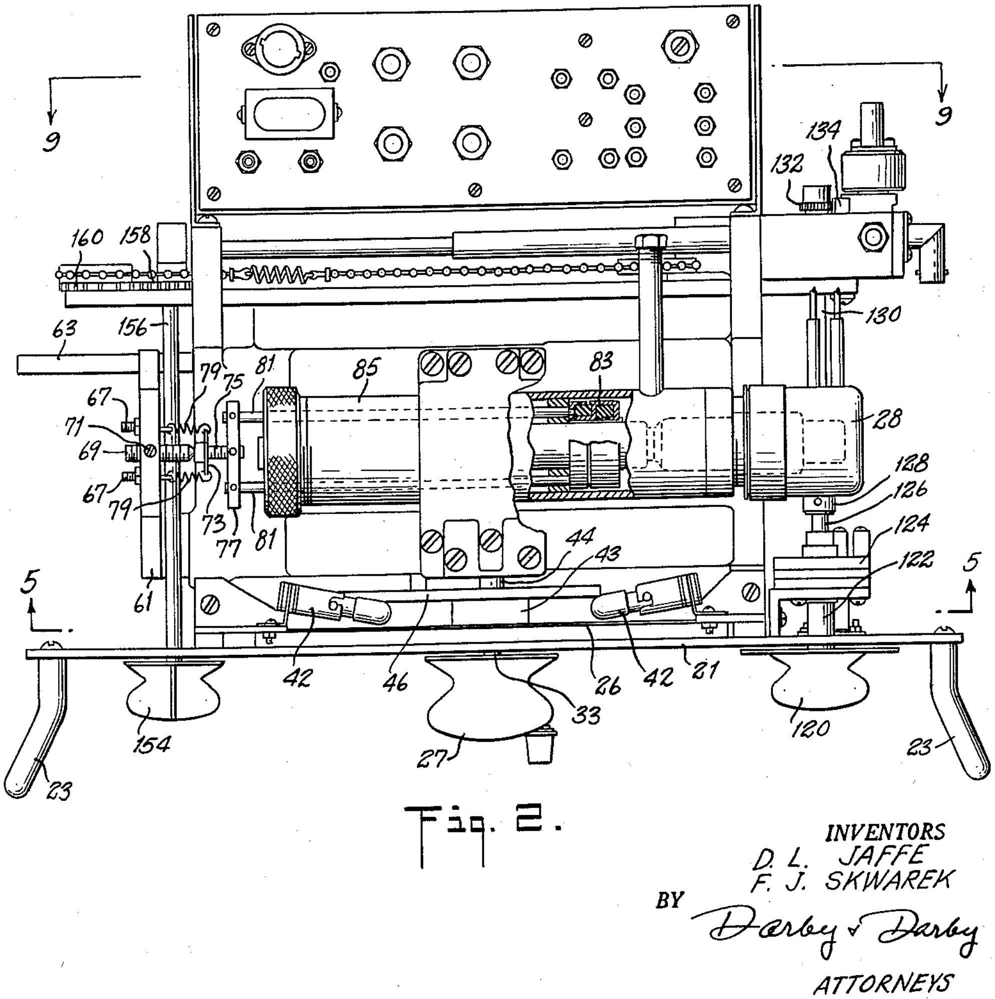
Fig. 2 is a top view of the apparatus of Fig. 1 somewhat enlarged.
Figures 3, 4:
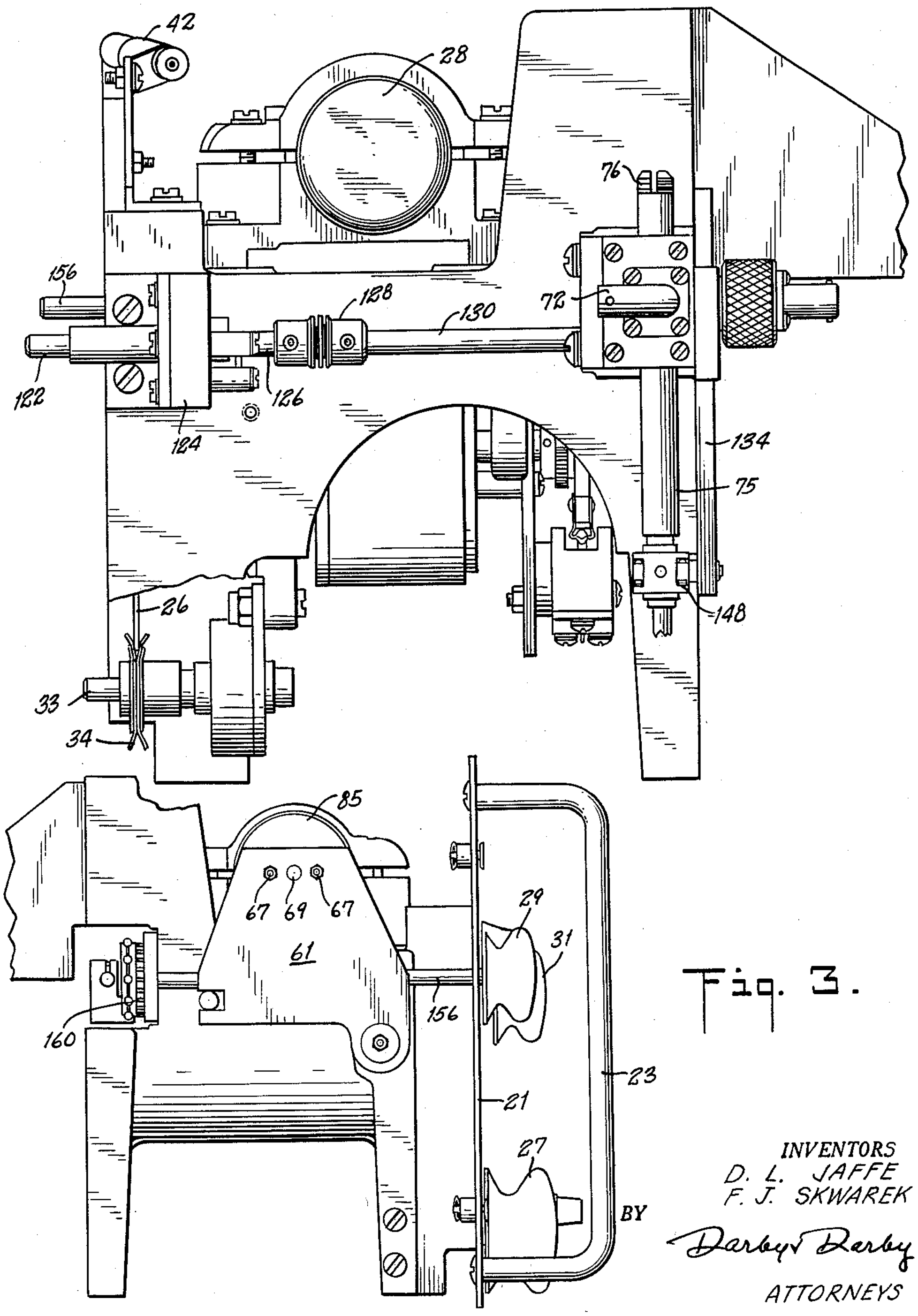
Fig. 3 is an end elevational view of the apparatus shown in Figs. 1 and 2 viewed along line 3—3 of Fig. 1.
Fig. 4 is an opposite end elevational view of the apparatus of Figs. 1 and 2 viewed along line 4—4 of Fig. 1.
Figure 5:
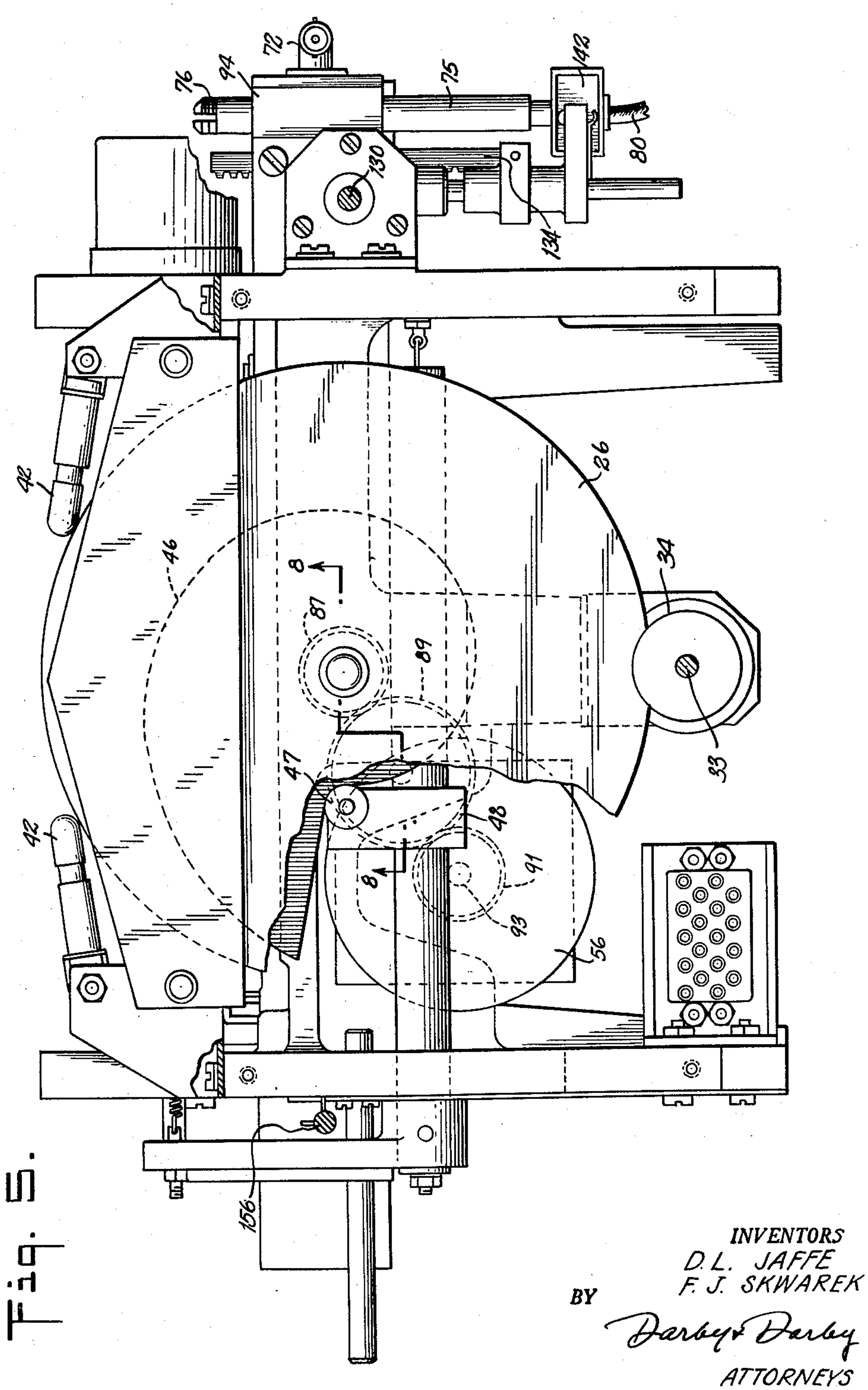
Fig. 5 is a front elevational view of said apparatus with the panel removed and portions shown cut away.

As shown more clearly in Figs. 2, 4 and 5, the tuning knob 27 is connected to a shaft 33 which carries a friction wheel 34 formed as a pair of resilient dished washers which engage the calibrated dial 26 therebetween. Suitable dial illuminating pilot lights 42 are provided in conventional manner. Dial 26 is connected to a hub 43 and thereby to a shaft 44 to which is secured a cam 46 having a cam follower 47 in contact therewith.

Figure 6:
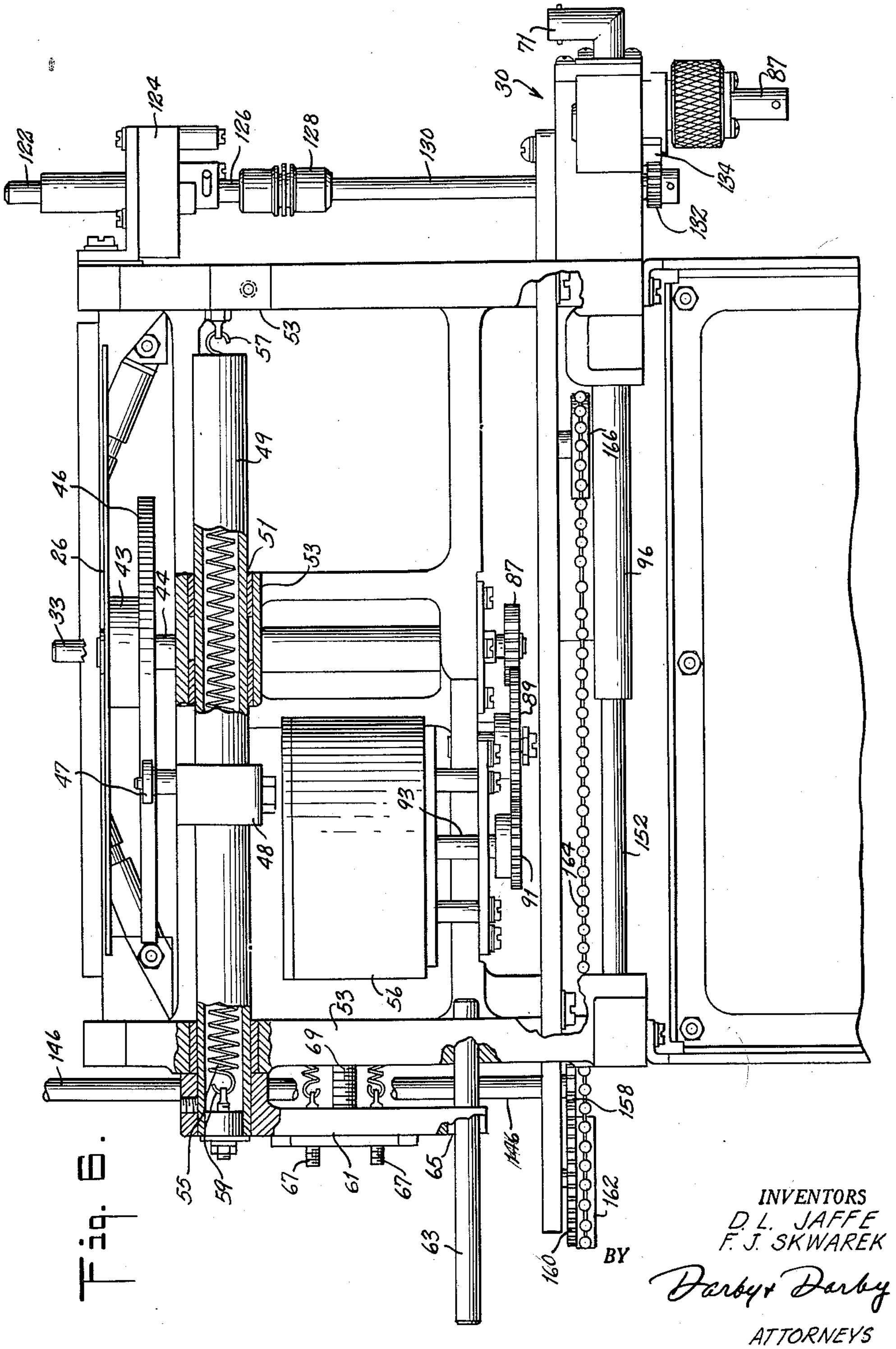
Fig. 6 is a bottom view of said apparatus with the panel removed.

As seen most clearly in Fig. 6, the cam follower 47 is held by block 48 which is mounted on a hollow tube 49 slidably mounted at 51 in the frame 53. A spring 55 within tube 49 is anchored at one end 57 to frame 53 and at the other end 59 to the tube 49. Tube 49 is clamped to a push yoke 61. A guide rod 63 is fixed to frame 53 and is slidably received within an opening 65 in yoke 61 to prevent tilting of yoke 61 during displacement thereof. Yoke 61 carries a pair of fixed threaded studs 67 and an adjusting screw 69 which may be fixed in position by a set screw 71. A spring retainer plate 73 is mounted on a screw link 75 threaded into a push rod yoke 77. A pair of springs 79 linked between respective studs 67 and plate 73 hold plate 73 against screw 69. The yoke 77 is fixed to a pair of push rods 81 whose other ends are secured to a movable short-circuiting plunger 83 of a coaxial live-type cavity resonator 85 connected to a reflex klystron oscillator tube 28.

In operation, rotation of knob 27 rotates dial 26 through friction wheel 34, and thereby rotates shaft 44 and cam 46. Cam follower 47 is kept in contact with cam 46 by spring 55, and follower 47 and tube 49 are therefore displaced upon rotation of knob 27, to displace yoke 61. Plate 73 is kept in contact with screw 69 by springs 79 and hence moves with yoke 61. In turn, plate 73 actuates yoke 77 and push rods 81 to tune resonator 85. Cam 46 is preferably of the type described and claimed in Skwarek application Serial No. 368,718, filed July 17, 1953, and issued as U.S. Patent No. 2,824,466 on February 25, 1958, and may be adjusted to yield a desired frequency as dial displacement characteristics, to give a desired dial calibration.

The oscillator tube 28 is preferably of the reflex klystron type whose cavity resonator 85 primarily determines the frequency output. It also has a reflector electrode whose potential to a lesser degree also determines the output frequency and the output power. Upon changing tuning of the cavity resonator it is well known in the operation of reflex klystrons that for optimum output the reflector voltage should also be varied, and this is done according to the present invention by extending the shaft 44 through bearings 64 in frame 53 to a set of gears 87, 89, 91 to a shaft 93 of a potentiometer 56 which varies the reflex klystron reflector voltage simultaneously with variation in tuning so as to obtain optimum output at each output frequency.

Also forming part of the present invention is a microwave mixer-attenuator device shown particularly in Figures 9–14 and indicated generally by reference number 30 in Figure 6. This mixer-attenuator 30 is adapted to be supplied with both the output of the oscillator 28, serving as a local oscillator in a superheterodyne receiver, and the signal being received, and to produce an intermediate frequency output from these two input signals.

The mixer-attenuator 30 is formed essentially as a function of six mutually perpendicular legs. As will be seen, three of these legs are input legs, one is an output leg, one is a tuning stub and the last is a termination leg. Each leg is essentially in the form of a coaxial line structure having outer and inner conductors, the inner conductors having a common junction 73 and the outer conductors being formed in a common block 94.

The first leg is the radio frequency signal direct input 71 which is in the form of a coaxial line coupling adapted to be connected to any conventional type of coaxial line, to which the direct radio frequency input signal may be applied. This input coupling 71 has its inner conductor 72 connected to the junction 73 and its outer conductor 69 to the common block 94 having a bore 95 forming a continuation of outer conductor 69.

A second input leg is shown at 76 and is a similar coaxial line coupling extending at right angles to input 71 and to which the output of the local oscillator 28 may be applied, whereby the local oscillator output is supplied directly to the junction 73.

Figure 14:
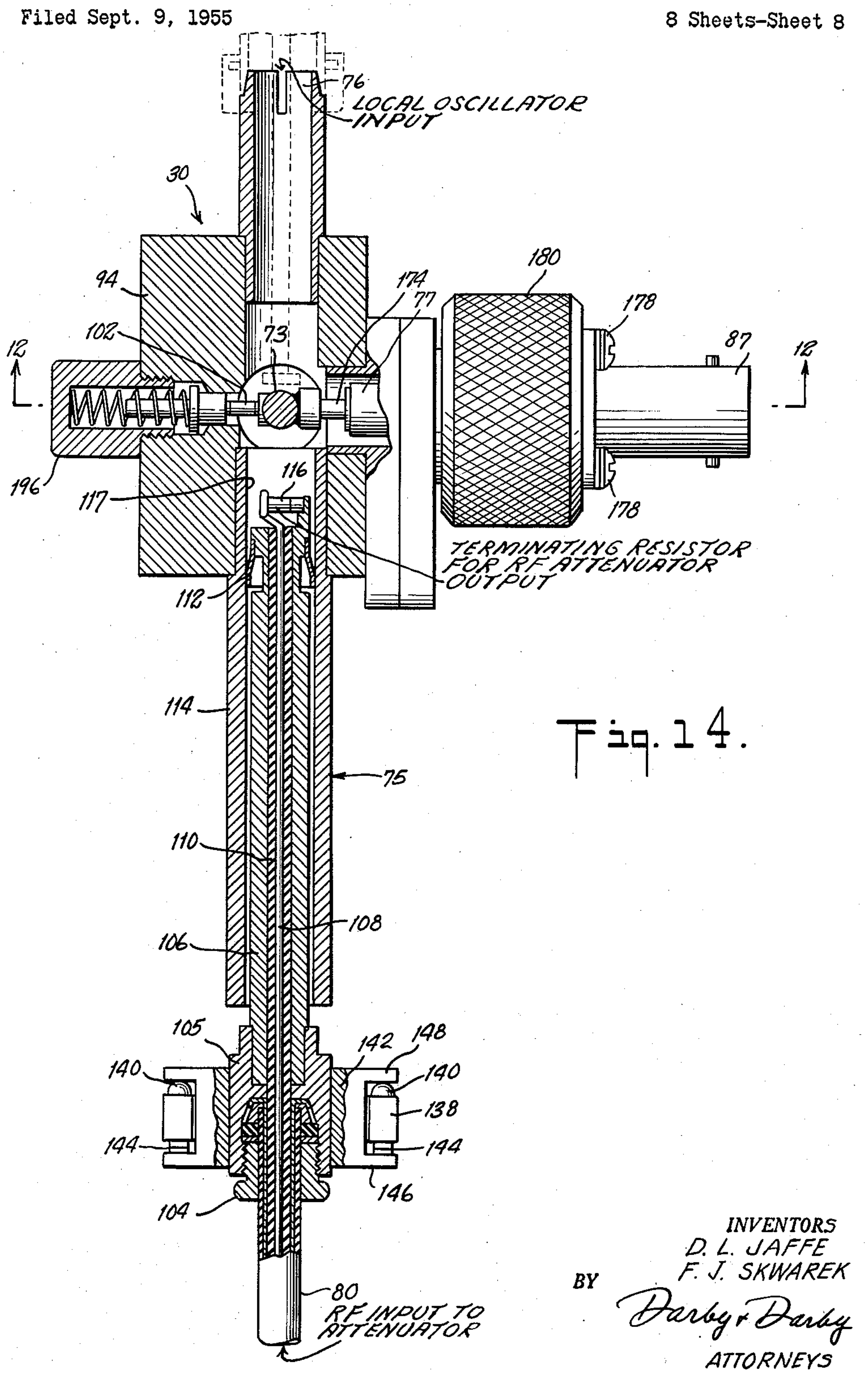
Fig. 14 is a fragmentary side elevational view of a portion of Fig. 9 viewed along line 14—14 thereof.

The third input is provided through the flexible coaxial line 80 shown in Figure 14 and an attenuator section 75, forming a third leg coupled to junction 73.

Figures 9, 10, 11:
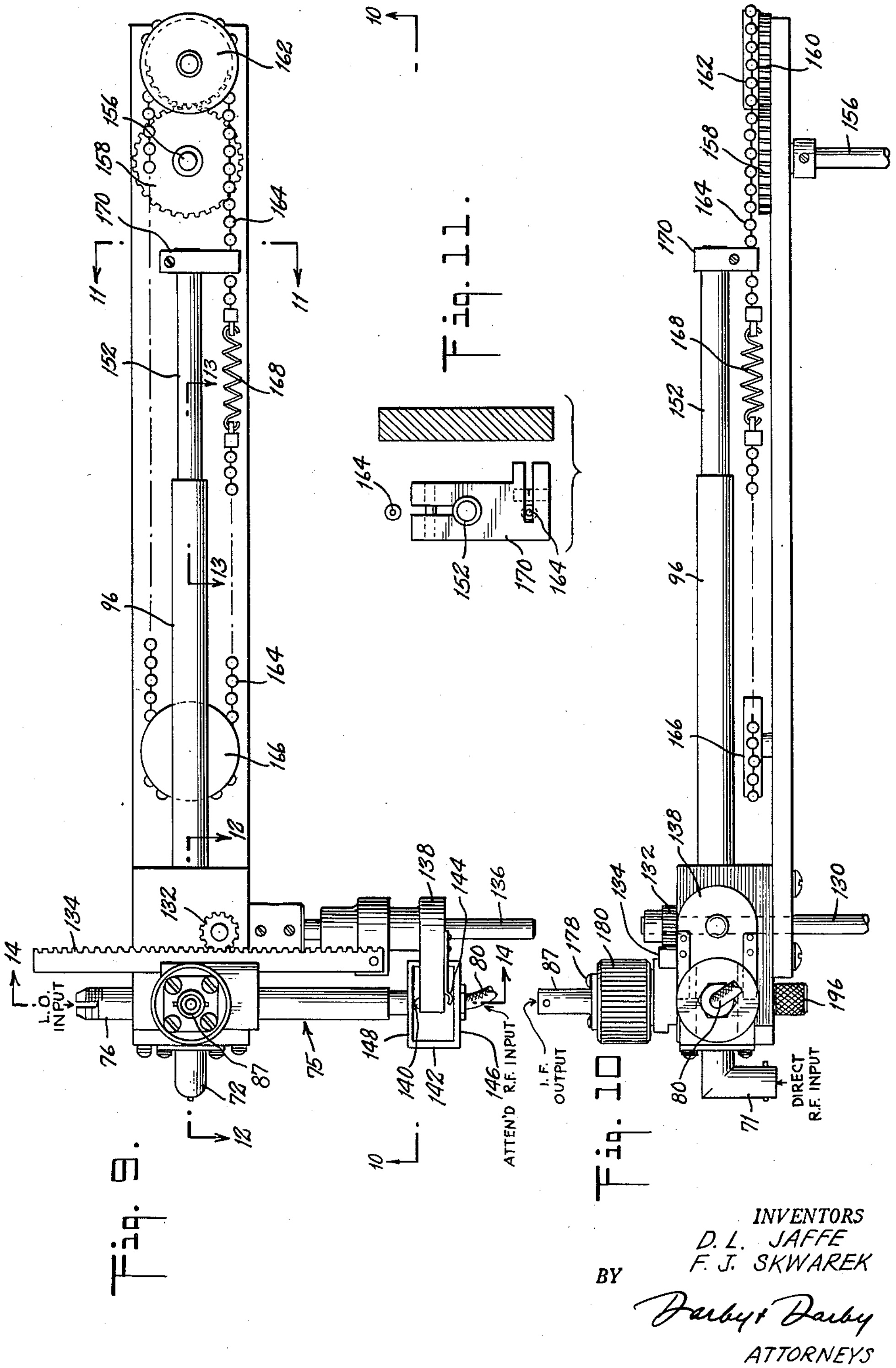
Fig. 9 is a back elevational view of one detail of said apparatus, viewed along line 9—9 of Fig. 2.
Fig. 10 is a bottom plan view of the detail of Fig. 9 viewed along line 10—10 thereof.
Fig. 11 is a cross sectional view of a detail of Fig. 9 viewed along line 11—11 thereof.

As seen best in Figures 9 and 14 and an attenuator section 75, forming a third leg coupled to junction 73.

As seen best in Figures 9 and 14, the flexible coaxial line 80 has its outer conductor or braid clamped between a threaded plug 104 and a hollow member 105 secured to a hollow conductor 106 having a bore receiving the inner conductor 108, dielectric 110 of flexible cable 80 and forming a coaxial line section therewith. The conductor 106 at its right end (as viewed in Fig. 14) is provided with spring fingers 112 which form sliding contact with the inner surface of the cylindrically bored member 114 fixed to block 94 and communicating with the cavity containing junction 73. Joined between the right end of the inner conductor 108 and the adjacent end of the outer conductor 106 is a terminating resistor 116 which forms a coupling loop. Resistor 116 has a proper value for terminating and preventing reflections in line 106, 108. The bore of member 114 provides a wave guide section 117 which is dimensioned below cut-off at the frequencies of operation. By sliding the coaxial line section 106, 108 and its terminating coupling 116 within member 114, the length of the below cut-off wave guide section 117 between resistor 116 and junction 73 may be varied, thereby interposing an adjustable attenuation between the source of radio frequency energy connected to input cable 80 and the junction 73.

The mechanical drive for adjusting this attenuation value is shown more clearly in Figures 2, 6 and 9. Provided on the front of panel 21 is attenuator control knob 120 which is coupled to the attenuating control shaft 122. Shaft 122 is coupled to a speed reducer 124 whose output shaft 126 is displaced but a fraction of the displacement of shaft 122. Shaft 126 is joined to shaft 130 by a flexible coupling 128 and thereby actuates a pinion secured to shaft 130 and engaging a rack 134, which is connected to a yoke 138 slidably mounted upon a guide 136 so as to move vertically together with the rack 134. The yoke 138 is provided with protuberances 140 on one side thereof and springs 144 on the other side thereof by which yoke 138 engaged a yoke follower 142 having a pair of flat plates 146 and 148 on either side of yoke 138. Accordingly, upon adjustment of the attenuation control knob 120, shaft 126 and shaft 130 are displaced at a proportionately reduced rate to actuate pinion 132, which in turn moves rack 134 and yoke 138 to cause yoke follower 142 to correspondingly adjust the attenuator coaxial line section 106, 108 and the coupling 116 to vary the length of low cut-off wave guide 117 to attenuate the signal applied to coaxial cable 80 to a desired value appearing at the mixer junction 73.

Figure 12:
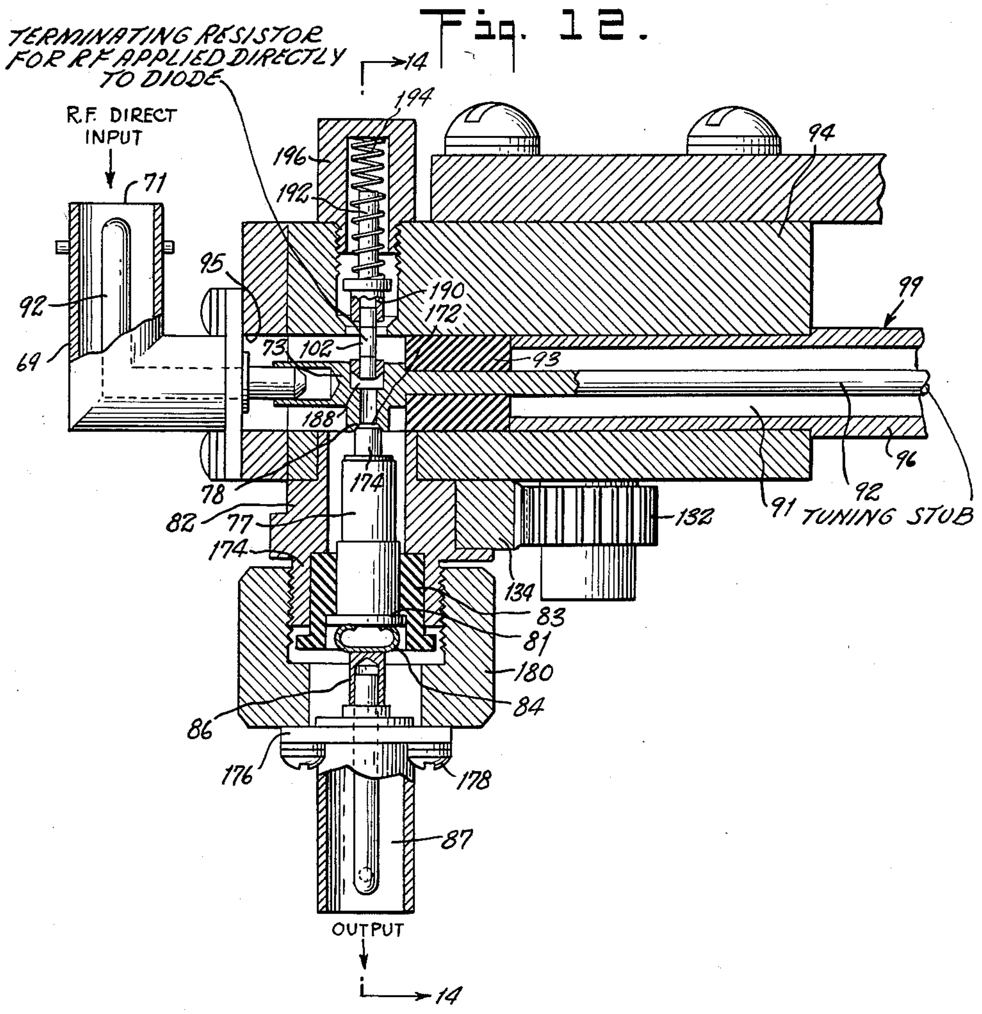
Fig. 12 is a horizontal cross sectional view of a portion of Fig. 9 viewed along line 12—12 thereof.
Figure 13:
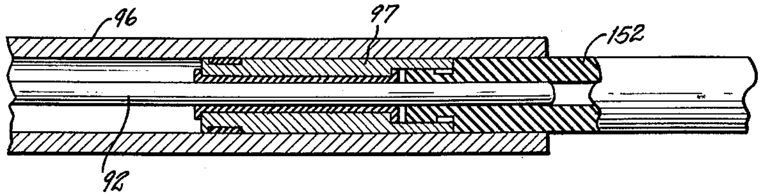
Fig. 13 is a horizontal cross sectional view of a portion of Fig. 9 viewed along line 13—13 thereof.

The fourth leg of the mixer attenuator is shown most clearly in Figures 12 and 13 and comprises a tuning stub 99 having a cylindrical outer conductor 96 with a coaxial inner conductor 92. The inner conductor 92 is conductively connected to the inner conductor junction 73 while the outer conductor 96 is secured to the block 94. A dielectric bead 93 provides a suitable impedance-matching coupling between the junction 73 and the tuning stub coaxial section 99. At the right end of the tuning stub 99 as viewed in Figures 12 and 13, is placed an adjustable plunger 97 secured to an insulating push rod 152. This push rod 152 is actuated from the tuning control knob 154 shown in Figure 2 by means of the following mechanism.

Tuning control knob 154 is connected to a tuning control shaft 146 on which is mounted a spur gear 158 which engages a second spur gear 160 to which is secured a pulley 162 for a bead chain 164 which passes thereover and over an idler pulley 166. A tension spring 168 between the ends of the bead chain 164 provides proper tension therefor. Clamped to the bead chain 164 by a clamp 170 is the insulating push rod 152 shown in Figure 13, whereby rotation of the tuning control knob 154 directly and linearly actuates the push rod 152 to adjust the length of the coaxial line section between the junction 73 and the plunger 97. The plunger 97 may have any suitable construction adapted to provide an effective short circuit between outer conductor 96 and inner conductor 92 of the coaxial line tuning stop. In one preferred embodiment this plunger 97 may assume the form of a tuning slug having the characteristics described and claimed in copending application Serial No. 470,671, filed November 23, 1954, in the name of D.L. Jaffe and entitled Wide Band Tuned Circuit. By means of this adjustable tuning stub, the mixer-attenuator can be properly tuned to the R.F. input to be applied thereto either directly by way of coupling 71 or with controllable attenuation through coupling 80.

The fifth leg of the mixer attenuator holds the crystal detector 77 which mixes the incoming radio frequency signal and the local oscillator signal to provide the intermediate frequency signal. The junction 73 is provided with a seat 172 which receives the tip 174 of the crystal 77 whose enlarged end 81 is seated in an insulating block 83. The inner conductor 86 of the I.F. output coupling 87 terminates in spring contacts or fingers 84 which are in electrical contact with the enlarged end 81 of the crystal detector 77. By removing the flange 176 secured by screws 178 to block 180, the I.F. output coupling may be disengaged from the remaining structure. The block 180 in turn is threadedly engaged upon a threaded post 174 forming part of the block 94 and upon removal of block 180 the crystal detector 77 may be removed as for replacement where necessary.

The sixth leg of the mixer attenuator is formed by the terminating resistor 102. This resistor preferably is formed as a very thin coating of a noble metal or a noble metal alloy on a ceramic or glass rod having a pair of conductive end caps. One of these end caps is received in a recess 188 in the junction 73 so as to be in electrical contact therewith. The second or outer end cap of resistor 102 is received in a socket 190 of a holder 192 which is resiliently urged by a spring 194 to maintain the resistor 102 in position and in contact. A removable cap 196 permits removal of the resistor 102 when desired. The resistor 102 has a resistance value adapted to provide a proper resistive impedance termination for the various input radio frequency connections to the mixer-attenuator structure.

Accordingly, the present invention has provided an extremely compact receiver tuner construction for microwave use including a local oscillator and tuning arrangement therefor in conjunction with a mixer-attenuator having a pair of R.F. inputs, one being a direct input and the other providing variable attenuation. A tuning stub is also provided for tuning the input radio frequency wave and the attenuator provides proper signal level for mixer action. The mixer is provided also with a terminating resistor and the construction of the entire apparatus forms an arrangement which is convenient to assemble and relatively simple to fabricate.

It will be understood that the foregoing description is intended to be illustrative only and should not be taken in any limiting sense. The invention is capable of many apparently widely varying but equivalent forms, and is defined solely by the appended claims.

What is claimed is:

1. A mixer attenuator apparatus for microwaves comprising a conductive block having 3 pairs of bores, each pair of bores being along one of three mutually perpendicular axes, inner conductors coaxially supported within three of said bores insulated from said block and meeting at a common junction at the junction of said bores, a crystal detector coaxially supported within a fourth of said bores and having one terminal connected to said junction, the other terminal of said crystal detector being connected to the inner conductor of an intermediate frequency output coaxial line, said latter coaxial line having an outer conductor connected to said block, a terminating resistor comprising a cylindrical member coaxially mounted within a fifth of said bores and having one terminal connected at said inner conductor junction, and means removably mounting said resistor within said fifth bore with its other terminal connected to said block, the sixth of said bores having a diameter dimensioned as a wave guide below cutoff at the operating frequency of said device and an attenuator coupled thereto, said attenuator comprising an inner conductor, an outer conductor mounted coaxially and rigidly with respect thereto, a terminating resistor connecting said outer and inner conductors at the end thereof facing said junction, said outer conductor being slidably mounted within said sixth bore and in electrical contact therewith, whereby adjustment of said coaxial line section along said bore interposes an adjustment length of said below-cutoff wave guide between said junction and latter terminating resistor.

2. A microwave mixer-attenuator comprising six legs joined at a common junction, one of said legs comprising a coaxial line received radio frequency signal input having an outer conductor and an inner conductor, a second of said legs comprising an attenuated received radio frequency signal input and comprising a section of below-cutoff wave guide communicating with said common junction and a fixed section of said line slidably mounted within said wave guide section and terminating therewithin in a coupling loop having a matching resistor as a portion thereof, a third of said legs comprising a local oscillator input arrangement, a fourth of said legs comprising a coaxial line section joined to said common junction and having an adjustable tuning plunger therewithin, a fifth of said legs comprising a crystal detector at said junction and a coupling coaxial line providing an intermediate frequency output, the sixth of said legs comprising a terminating and matching resistor having one end at said junction.

3. A mixer-attenuator comprising a conductive block having a pair of transverse crossing bores therethrough, a terminating resistor in one of said bores, a crystal detector aligned with said resistor in said one bore and having one terminal connected to one terminal of said resistor, said latter connection extending across said other bore, the other terminal of said resistor being conductively connected to said block, a first-signal coupling communicating with one end of said other bore, a coaxial line section slidably mounted within the other end of said other bore and terminating within said bore in a coupling element, said line section being adapted to be coupled to a source of second signal, and an intermediate frequency output coupled to the other terminal of said detector for deriving therefrom a beat frequency of said first and second signals.

References Cited in the file of this patent

UNITED STATES PATENTS

| | | |
|---|---|---|
| 2,433,387 | Mumford | Dec. 30, 1947 |
| 2,514,544 | Hansen | July 11, 1950 |
| 2,637,813 | Braden | May 5, 1953 |
| 2,638,544 | Schreiner | May 12, 1953 |
| 2,710,346 | Schmidt | June 7, 1955 |
| 2,730,619 | Parnell et al. | Jan. 10, 1956 |
| 2,796,586 | Goldstein | June 18, 1957 |
| 2,813,972 | Anderson et al. | Nov. 19, 1957 |

FOREIGN PATENTS

| | | |
|---|---|---|
| 673,012 | Great Britain | May 28, 1952 |

OTHER REFERENCES

"Microwave Mixers," Radiation Laboratory Series (Mit), vol. 16, p. 188.